H. BOLLMANN.
PROCESS FOR THE REMOVAL OF FATTY ACIDS, RESINS, BITTER AND MUCILAGINOUS SUBSTANCES
FROM FATS AND OILS.
APPLICATION FILED JUNE 22, 1920.
1,371,342.
Patented Mar. 15, 1921.
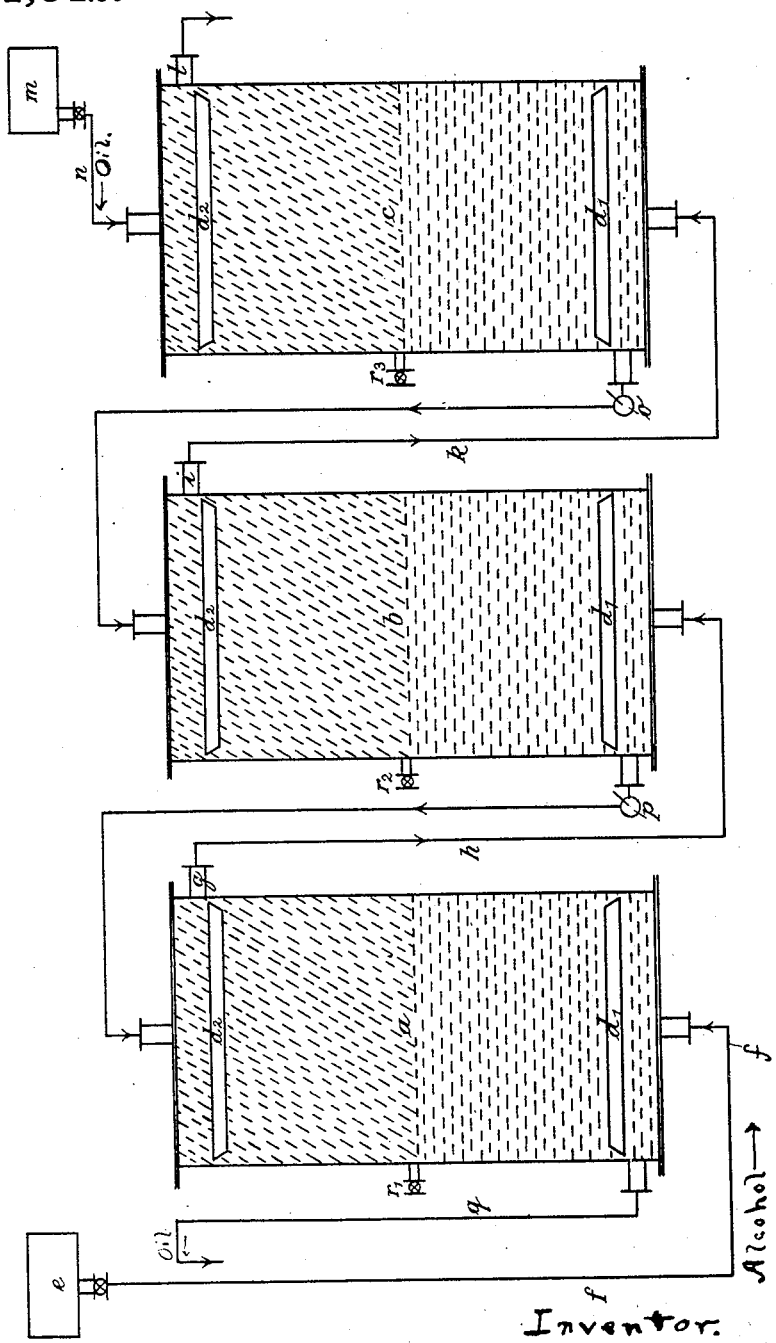
Inventor.
H ermann Bollmann
By G. B Foster
attorney.

UNITED STATES PATENT OFFICE.

HERMANN BOLLMANN, OF HAMBURG, GERMANY.

PROCESS FOR THE REMOVAL OF FATTY ACIDS, RESINS, BITTER AND MUCILAGINOUS SUBSTANCES FROM FATS AND OILS.

1,371,342.  Specification of Letters Patent.  Patented Mar. 15, 1921.

Application filed June 22, 1920. Serial No. 390,952.

*To all whom it may concern:*

Be it known that I, HERMANN BOLLMANN, a citizen of Hamburg, Germany, residing at Hamburg, Germany, have invented certain new and useful Improvements in Processes for the Removal of Fatty Acids, Resins, Bitter and Mucilaginous Substances from Fats and Oils, of which the following is a specification.

It is known to free fats and oils from acids by lixiviation in a counter current process with diluted alcohol of 96 per cent. by volume. For the same purpose it has already been proposed to use acetone. These processes however have not been successful by reason of the formation of emulsions which it is hardly possible to separate.

According to the process forming this invention the formation of emulsions is counteracted, and the whole of the neutral fat present is recovered with only a small loss.

The lixiviation of the fats and oils is effected by means of solvents capable of miscibility and dilution with water such as with diluted methyl alcohol, ethyl alcohol, amyl alcohol, acetone or acetic ester which have the power of dissolving fatty acids and other impurities, but not the neutral oils. The dilution of the solvent is so chosen as to provide for a sufficient difference between its own specific gravity and that of the oil to be purified. The process consists in lixiviating the fats and oils in successive stages with one of the solvents in a counter current process in which the oil is separated from the solvent before proceeding to the next stage.

In every successive stage the fat repeatedly encounters purer alcohol, acetone or the like. The parts which have gone into solution are separated from the solvent (for example, by a distillation of the latter) after it has traversed all the stages in the process. The purified neutral fat and the free fatty acids are separated from the solvent in the well known manner.

For carrying the process into effect, use is made for example, of a six stage washing apparatus with agitating mechanism and separating vessels interposed between the stages.

If it is desired to remove the free fatty acid from 3,000 kg. of rape oil having a fatty acid content of 12 per cent., use is made for a de-acidifying agent for example, of three times the quantity, that is to say 9,000 kg. of 96 per cent. alcohol.

The oil enters from above by way of a regulating cock slowly into the washing apparatus which is filled with alcohol, and the agitating mechanism of the washing apparatus is set in motion. At the same time alcohol is admitted from below at such a speed that always 1 part of oil and three parts of alcohol enter the apparatus afresh. In the uppermost stage the oil and alcohol are thoroughly mixed, after which the mixture enters at a uniform rate into the separating vessel situated by the side.

The oil and the alcohol containing the dissolved fatty acids separate themselves according to their specific gravity.

The oil falls to the bottom of the separating vessel and then enters into the second washing stage while the alcohol with the dissolved fatty acids leaves the separating vessel and is separated by distillation in known manner into alcohol and fatty acids.

The oil washed once in the uppermost stage flows from the separating vessel into the second washing stage where it encounters purer alcohol with which it is mixed, then again passing into a separating vessel from which the oil enters the third washing stage, while the mixture of alcohol and fatty acids passes into the first washing stage, and so on until the oil has reached the lowermost washing stage in which it is washed with the purest alcohol. The oil then leaves the apparatus for the purpose of being freed from the alcohol dissolved in it in known manner by subsequent distillation.

The process is carried out at a temperature of 20–30° C. and is cyclic since the alcohol coming from the washing apparatus enters the separating vessel, and after being freed from fatty acids and other impurities, is returned to the washing apparatus.

If it be desired to deacidify a hard fat such as cocoanut oil, use is made for example, of an eight stage washing column without an agitating mechanism but provided with a retarding charge or contrivance such as Raschig rings. The bottom of each stage is so arranged that the specifically heavier liquid—in this case the oil—is separated thereon by deposition from the alcohol in order subsequently to pass by way of a siphoning device to the next lower stage.

Moreover, each stage is equipped for the separation of the alcohol fatty acid mixture. If it is desired to deacidify 3,000 kg. of cocoanut oil with a fatty acid content of 15 per cent. it is necessary to use about 10,500 kg. of 92% methyl alcohol.

The operation is carried out at 40–50° C. in order that the fat may be maintained in a liquid condition. The column is again recharged with alcohol; the fat enters the uppermost stage at a slow rate, and three and a half times the quantity of alcohol enters the lowest stage of the column. An intimate contact of the alcohol with the fat takes place at each stage. The fat settles on the bottom of the stage and the mixture of alcohol and fatty acids above it, so that the lighter mixture of alcohol and fatty acids passes into the upper stage, and the heavier fat into the lower stage.

Both substances are thus brought into intimate contact in each stage and are so conducted that transition from one stage to another takes place only in separated condition in opposite directions, that is to say, the oil encounters purer alcohol in each successive stage, whereas the alcohol encounters an oil richer in fatty acids at each new stage.

So that by increasing the number of stages on the one hand, the fatty acid can be removed practically in its entirety, while on the other hand the alcohol can be fully utilized.

The oil flowing away from the column with a little dissolved alcohol, and the alcohol with fatty acid and other impurities removed from the oil are then treated further in known manner.

The fats and oils purified in this manner are distinguished by extraordinarily high stability, while the alcohol in contradistinction to alkalis exercises no splitting action on the fatty esters; moreover, the fat splitting enzyms are killed by alcohol.

The accompanying drawing represents a diagrammatic view in section, of apparatus suitable for carrying out the process of the present invention.

In said drawing $a$, $b$ and $c$ are three cylindrical containers provided near their bottoms with dividing plates $d_1$. In the upper portion of each of the containers are dividing plates $d_2$. The receptacles themselves are preferably filled with suitable filling material such as Raschig rings.

Alcohol, of the strength above referred to, is run in from the tank $e$ through pipe $f$ into the bottom part of $a$, said alcohol leaving $a$ through the nipple $g$ and pipe $h$ into the bottom of $b$ and out through $i$ and $k$ into the bottom of $c$ and finally out through $l$. The oil to be treated, containing impurities, is introduced from tank $m$ through pipe $n$, is elevated by pump $o$ from the bottom of the tank $c$ to the top of the tank $b$, is again elevated by pump $p$ from the bottom of the tank $b$ to the top of the tank $a$, and is finally drawn off through the pipe $q$. In each of the tanks or containers $a$, $b$ and $c$ the washing of the oil with the solvent is performed systematically and continuously, whereby a very small quantity of alcohol sufficient for the purification of a large quantity of oil and the alcoholic solution leaving through pipe $l$ may pass to a rectifier, and after rectification, may be reintroduced into the tank $e$.

In each of the tanks $a$, $b$ and $c$ are provided at about the middle point of the height thereof, valved pipes $r_1$, $r_2$ and $r_3$, respectively, through which insoluble components and dirty sediments accumulated between the two liquids in the tanks may be drawn off.

I claim:—

A process for the removal of impurities from fats and oils which comprises passing a continuous current of diluted solvent of the impurities present in fats and oils in one direction through a systematic leaching apparatus, and passing a continuous current of oil to be purified in the opposite direction through such system, such oil containing free fatty acid as an impurity, and in each stage of the process passing the said diluted solvent upwardly and passing the oil downwardly through a body of stationary filling material, whereby intimate contact of the oil with the solvent is effected without violent agitation of the materials with each other, whereby the quantity of difficultly separatable emulsion produced is reduced to a minimum.

In testimony whereof I affix my signature.

HERMANN BOLLMANN.